(12) United States Patent
Gunther

(10) Patent No.: US 11,965,952 B2
(45) Date of Patent: Apr. 23, 2024

(54) METHODS AND SYSTEMS FOR ULTRA-WIDEBAND (UWB) BASED SUBWAY PERSONNEL DETECTION

(71) Applicant: Metrom Rail, LLC, Crystal Lake, IL (US)

(72) Inventor: Kurt A. Gunther, Leland, IL (US)

(73) Assignee: METROM RAIL, LLC, Crystal Lake, IL (US)

( * ) Notice: Subject to any disclaimer, the term of this patent is extended or adjusted under 35 U.S.C. 154(b) by 22 days.

(21) Appl. No.: 16/697,906

(22) Filed: Nov. 27, 2019

(65) Prior Publication Data
US 2020/0166624 A1    May 28, 2020

Related U.S. Application Data

(60) Provisional application No. 62/772,426, filed on Nov. 28, 2018.

(51) Int. Cl.
*G01S 13/04*  (2006.01)
*G01S 13/02*  (2006.01)
*G01S 13/88*  (2006.01)

(52) U.S. Cl.
CPC .......... *G01S 13/04* (2013.01); *G01S 13/0209* (2013.01); *G01S 13/886* (2013.01)

(58) Field of Classification Search
CPC ..... G01S 13/04; G01S 13/0209; G01S 13/886
USPC .......................................................... 342/21
See application file for complete search history.

(56) References Cited

U.S. PATENT DOCUMENTS

| | | | |
|---|---|---|---|
| 2,188,293 A | 1/1940 | Williams | |
| 2,216,575 A | 10/1940 | Seinfeld et al. | |
| 3,898,652 A | 8/1975 | Rashid | |
| 5,036,478 A | 7/1991 | MacDougall | |
| 5,283,589 A | 2/1994 | Blevins | |

(Continued)

FOREIGN PATENT DOCUMENTS

| DE | 102008020700 | 11/2009 |
|---|---|---|
| EP | 1785744 | 5/2007 |

(Continued)

OTHER PUBLICATIONS

Mroue et al. (UWB Radar for Railway Fall on Track Object Detection and Identification) (Year: 2009).*

(Continued)

*Primary Examiner* — Nuzhat Pervin
(74) *Attorney, Agent, or Firm* — McAndrews, Held & Malloy, Ltd.

(57) ABSTRACT

Systems and methods are provided for subway personnel detection. An ultra-wideband (UWB) based detection of objects in subway tunnels may include transmitting UWB signals into an area within a subway tunnel, the area including one or more tracks traversed by trains running in the subway tunnel, receiving UWB signals within the area, and processing received UWB signals to enable detecting objects within the area. The processing may include identifying received UWB signals corresponding to echoes of the transmitted UWB signal transmitted by the detection devices, and detecting based on the echoes of the transmitted UWB signals when an object is present within the area. The object may be assessed, such as to determine when the object represents an intrusion within the area of the subway tunnel.

23 Claims, 4 Drawing Sheets

(56) References Cited

U.S. PATENT DOCUMENTS

| | | | |
|---|---|---|---|
| 5,452,870 A | 9/1995 | Heggestad | |
| 5,907,294 A | 5/1999 | Welte et al. | |
| 5,950,966 A | 9/1999 | Hungate et al. | |
| 6,113,037 A | 9/2000 | Pace | |
| 6,133,876 A | 10/2000 | Fullerton et al. | |
| 6,271,754 B1* | 8/2001 | Durtler | G08B 13/2491 |
| | | | 340/567 |
| 6,597,293 B1 | 7/2003 | Harrison | |
| 6,631,322 B1 | 10/2003 | Arthur et al. | |
| 6,759,948 B2 | 7/2004 | Grisham et al. | |
| 7,075,427 B1 | 7/2006 | Pace et al. | |
| 7,148,791 B2* | 12/2006 | Grisham | B61L 29/24 |
| | | | 340/904 |
| 7,725,252 B2 | 5/2010 | Heddebaut et al. | |
| 8,874,359 B2 | 10/2014 | Douglas et al. | |
| 9,297,887 B2* | 3/2016 | Yasugi | G01S 7/295 |
| 9,365,155 B2* | 6/2016 | Hathaway | G01S 7/10 |
| 9,434,396 B2 | 9/2016 | Chung et al. | |
| 9,606,217 B2 | 3/2017 | Bruemmer et al. | |
| 9,759,812 B2* | 9/2017 | Nichols | G08G 1/096741 |
| 10,288,737 B2* | 5/2019 | Mooney | G01S 7/486 |
| 10,338,206 B2* | 7/2019 | DiPoala | G01S 13/886 |
| 10,607,090 B2* | 3/2020 | Karlsson | B61L 27/57 |
| 11,164,017 B2* | 11/2021 | Vossoughi | H04W 4/024 |
| 11,720,111 B2* | 8/2023 | Deyle | G01S 13/876 |
| | | | 700/245 |
| 2004/0155822 A1 | 8/2004 | Lien | |
| 2004/0240565 A1 | 12/2004 | Santhoff et al. | |
| 2005/0143037 A1 | 6/2005 | Stratis et al. | |
| 2006/0009240 A1 | 1/2006 | Katz | |
| 2006/0199146 A1 | 9/2006 | Mandelkern et al. | |
| 2007/0241888 A1 | 10/2007 | MantoVani et al. | |
| 2007/0255498 A1 | 11/2007 | McDaniel et al. | |
| 2007/0281745 A1 | 12/2007 | Parkulo et al. | |
| 2007/0293153 A1 | 12/2007 | Molisch et al. | |
| 2008/0007445 A1* | 1/2008 | Leach, Jr. | H01Q 7/00 |
| | | | 343/866 |
| 2008/0117043 A1* | 5/2008 | Van Den Abeele | B61L 23/041 |
| | | | 340/540 |
| 2008/0150786 A1 | 6/2008 | Breed | |
| 2008/0165046 A1* | 7/2008 | Fullerton | G01S 7/003 |
| | | | 342/21 |
| 2008/0170533 A1 | 7/2008 | Cyzs et al. | |
| 2009/0243397 A1 | 10/2009 | Cook et al. | |
| 2009/0253439 A1 | 10/2009 | Gantner et al. | |
| 2009/0255329 A1 | 10/2009 | Connell et al. | |
| 2010/0004804 A1* | 1/2010 | Anderson | B61K 9/08 |
| | | | 701/19 |
| 2010/0039978 A1 | 2/2010 | Rangan | |
| 2010/0052945 A1 | 3/2010 | Breed | |
| 2010/0124898 A1 | 5/2010 | Qu et al. | |
| 2010/0235460 A1 | 9/2010 | Mochizuki et al. | |
| 2011/0006912 A1 | 1/2011 | Sheardown et al. | |
| 2011/0084854 A1 | 4/2011 | Johnson | |
| 2012/0077537 A1 | 3/2012 | Muratov et al. | |
| 2012/0182191 A1 | 7/2012 | King | |
| 2012/0296562 A1 | 11/2012 | Carlson et al. | |
| 2012/0326891 A1 | 12/2012 | Cross | |
| 2013/0021215 A1 | 1/2013 | Suzuki et al. | |
| 2013/0138276 A1 | 5/2013 | Soderi et al. | |
| 2013/0214990 A1 | 8/2013 | Chiu | |
| 2013/0237273 A1 | 9/2013 | Klein et al. | |
| 2013/0256466 A1 | 10/2013 | Carlson et al. | |
| 2014/0159941 A1* | 6/2014 | Yasugi | G01S 13/42 |
| | | | 342/146 |
| 2014/0173155 A1 | 6/2014 | Slattery | |
| 2015/0060608 A1* | 3/2015 | Carlson | B61L 25/021 |
| | | | 246/122 R |
| 2015/0097412 A1 | 4/2015 | Smith | |
| 2015/0329130 A1 | 11/2015 | Carlson et al. | |
| 2016/0039339 A1* | 2/2016 | Engel | B61L 27/53 |
| | | | 340/435 |
| 2016/0046308 A1 | 2/2016 | Chung et al. | |
| 2016/0176422 A1 | 6/2016 | Cross | |
| 2019/0263432 A1* | 8/2019 | Carlson | B61L 15/0058 |
| 2019/0337545 A1* | 11/2019 | Carlson | B61L 3/125 |

FOREIGN PATENT DOCUMENTS

| | | | | |
|---|---|---|---|---|
| EP | 2571742 | | 11/2009 | |
| EP | 2814012 A1 * | | 12/2014 | G01S 13/04 |
| WO | 03009254 | | 1/2003 | |
| WO | WO-2008013515 A2 * | | 1/2008 | B66B 1/3476 |
| WO | 2013056244 | | 4/2013 | |

OTHER PUBLICATIONS

Mroueeetal.(UWBRadarforRailwayFallonTrackObjectDetectionand Identification) (Year: 2009).*

Inetrnational Search Report and Written Opinion for PCT/US2019/63653, mailed Feb. 18, 2020, 5 pages.

Certified English-Language Translation of German Patent Application Pub. No. DE102008020700A1 ("Meyer"), 13 pages.

IEEE Standard for Local and Metropolitan Area Networks: Part 15.4: Low-Rate Wireless Personal Area Networks (LR- WPANs), IEEE Std 802.15.4™—2011, Sep. 5, 2011, 314 pages.

Newton's Telecom Dictionary (27th ed 2013), 3 pages.

Time Domain's Ultra Wideband (UWB) Definition and Advantages, Time Domain (Mar. 2011), 14 pages.

Int. J. ITS Res.(2016), "Assessment of the Contribution of Time Reversal of a UWB Localization System for Railway Application", 13 pages.

ETSI Technical Report 101 538 V1.1.1 (Oct. 2012), 34 pages.

C. L. Bennett and G. F. Ross, "Time-domain electromagnetics and its applications," in Proceedings of the IEEE, vol. 66, No. 3, pp. 299-318, Mar. 1978, 23 pages.

An Outdoor UWB Tracking System to Improve Safety of Semi-Autonomous Vehicle Operations ("Richardson"), 13 pages.

"Driving Assistance Provided by Adaptive Cruise Control", P. Fancher, et al., University of Michigan Transportation Research Institute. 13 pages.

SAE J2735/2009-11, 359 pages.

"Operation of the Eaton VORAD Collision Warning System and Analysis of the Recorded Data", David A. Danaher, et al., Veritech Consulting Engineering, LLC., 10 pages.

"Transponder History—RADAR Identification of Aircraft", Experimental Aircraft Info, Jul. 20, 2022, 5 pages.

"Collision of Metrolink Train 111 With Union Pacific Train LOF65-12", National Transportation Safety Board Accident Report, Sep. 12, 2008, 83 pages.

"Collisions & Casualties by Year", Federal Railroad Administration, 3 pages.

"Fatal Crashes at Highway Rail Grade Crossings", International Journal of Transportation Science and Technology, vol. 11, Issue 1, Mar. 2022, 23 pages.

"Highway-Rail Grade Crossings Overview", U.S. Department of Transportation, Federal Railroad Administration, Last updated: Wednesday, Dec. 4, 2019, 2 pages.

"Railroad Accident: Common Causes, Statistics and Prevention", 10 pages.

Positive Train Control, May 2012, 25 pages.

"CCS: A Railway Corridor Control System Utilizing UWB Radio Technology", Paul A. Flaherty, 2004 ASME/IEEE Joint Rail Conference, Apr. 6-8, 2004, 4 pages.

Inetrnational Preliminary Report on Patentability for PCT/US2019/063653, mailed Jun. 10, 2021, 9 pages.

* cited by examiner

METHODS AND SYSTEMS FOR ULTRA-WIDEBAND (UWB) BASED SUBWAY PERSONNEL DETECTION

CLAIM OF PRIORITY

This patent application makes reference to, claims priority to, and claims benefit from U.S. Provisional Patent Application Ser. No. 62/772,426, filed on Nov. 28, 2018. The above identified application is incorporated herein by reference in its entirety.

TECHNICAL FIELD

Aspects of the present disclosure relate to railway control solutions. Various implementations of the present disclosure relate to subway personnel detection and use thereof with railway systems.

BACKGROUND

Conventional solutions for managing safety in subway systems (particularly detection of personnel in subway tunnels), if any existed, for controlling braking functions and components in trains may be costly, inefficient, and cumbersome. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for subway personnel detection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
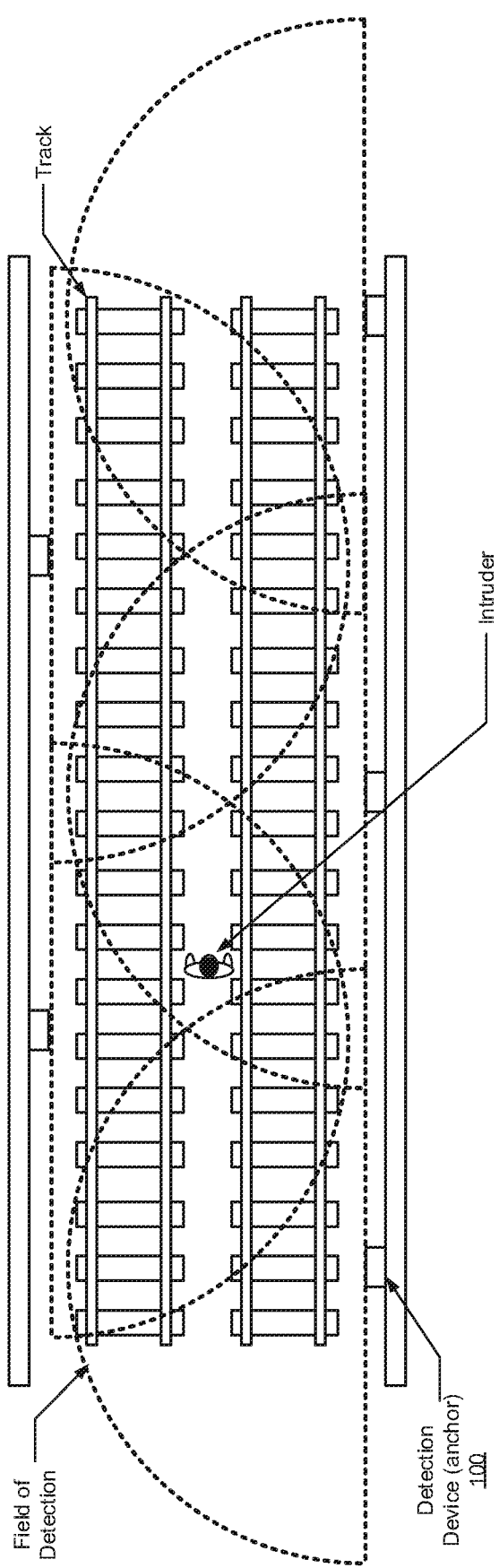
FIG. 1 illustrates an example deployment of subway personnel detection system, in accordance with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Implementations in accordance with the present disclosure are directed to solutions for personnel detection in train systems, particularly in subway systems. In this regard, rail transit authorities that operate trains in subterranean locations (subways) face unique challenges in instances relating to trespassing—that is, where persons may be trespassing on the railroad tracks by unauthorized persons. There may be severe hazards facing people who improperly enter the track areas. This action may result in serious injury or death. The hazards may include being struck by a train, getting a foot or other part of the body pinched in a track switch when it moves, and getting electrocuted (particularly if the subway tracks have an electrified third rail).

Entry onto track surfaces by unauthorized persons is not a rare event. For example, the Toronto Transit Commission (TTC) reported 148 service disruptions due to trespassing on subway property in the nine months between January and September of 2017, or about one incident every other day on average. The numbers in earlier years were generally similar, with 167 incidents in 2016 and 160 incidents in 2015. This issue is not isolated to Toronto and its transit system, as there are similar recorded subway trespassing problems in Montreal, Boston, New York City, Washington D.C., and numerous other cities in North America and other regions of the world.

Such trespassing events may be very disruptive for the transit authorities, and may also burden other agencies, such as law enforcement agencies, which may need to address such intrusions, and in the process put their personnel at risk as they are often enlisted to pursue the trespassers on track right-of-way. The greatest magnitude of impact, perhaps, is upon the users of the transit system, in particular when these intrusions occur at certain points, such as during "rush hour", which may disrupt the commute of a large number of people (passengers).

To protect the intruders and/or others who may be present due to presence of the intruders (e.g., police officers who may be in pursuit), the transit authorities may be often be forced to take drastic measures, such as cutting power, stopping service in the area of the trespass when the intruders and/or the others are still on location—that is, in the subway tunnels. Such disruption may be significant—e.g., it is not unusual for the disruption caused by a trespasser to last 30 to 40 minutes, until the situation is resolved (e.g., ending in capture of the intruder, or a determination that the area impacted is clear (because the trespasser has left the area). During "rush hour", on certain transit systems, there could be 2,000 passengers on each crowded train, and a 30-minute disruption could easily delay 20 trains in a single direction, or 40 trains in both directions.

Accordingly, solutions that address such trespassing incidents are desirable. In this regard, reducing the time required to locate intruders may have a significant impact on reducing the disruption caused by trespassing in the transit system. Given a high train density during rush hour, a decrease of even five minutes in the time required to locate the intruder can significantly improve transit operations. Hence, systems that may help quickly locate intruders may allow a reduction in the number of police necessary to apprehend the individual(s). Such reduction in the required number of officers may also help reduce the cost of police staffing.

Trespassers are particularly problematic in subways due to the poor visibility in the subway, making finding the intruders difficult and time-consuming. This difficulty is a result of poor underground lighting, poor visual sightlines, dividing walls between tracks, and numerous places where the intruder may hide when officers approach.

While it is possible to install surveillance systems in the subways to aid in location of the trespassing individual(s), such a solution is costly because it requires the purchase of hundreds or thousands of cameras. Also required is cabling and power sources for the cameras, additional networking systems to manage the large number of image sources. In addition, the cost of the labor for the installation and maintenance of this infrastructure is significant. For these reasons, installing video cameras and the required infrastructure in the subways is not usually an acceptable approach from a cost perspective.

Accordingly, the present disclosure provides solutions for personnel detection, which may overcome at least some of the challenges of existing solutions. For example, in various implementations in accordance with the present disclosure, ultra-wideband (UWB) based systems are used, which provide enhanced detection and/or overcome some of the challenges noted above.

An example personnel detection system in accordance with the present disclosure may comprise a number of ultra-wideband (UWB) based detection devices, which may be configured to detect (e.g., operating in radar-like manner) intruders in subway tunnels. In this regard, UWB-based personnel detection may be configured for detecting potential intruders based on particular detection criteria, which may be adaptively set and/or adjusted to optimize performance. Further, the systems (or components thereof) may be configured for adaptive deployment to ensure optimal performance. For example, the detection units may be configured for deployment at locations that provide optimal detection of possible intruders.

To reduce costs and/or optimize performance, the personnel detection system may build on other ultra-wideband (UWB) based train systems developed and/or deployed in transit systems. In this regard, a significant decrease in the cost of an intruder surveillance system may be realized if the existing infrastructure may be temporarily repurposed for this surveillance purposes. Such introduction of impulse-based UWB train-positioning technology into subways may offer a technology platform that may also be used to detect personnel movement in the subway tunnel.

For example, UWB train positioning systems in subways generally consist of wall or ceiling mounted UWB transceivers known as "anchors". These anchors may be installed along the subway track (wayside) at intervals generally ranging from 70 feet to 1,000 feet (20 meters to 300 meters) apart, depending upon the UWB technology. The anchors perform wireless range UWB measurements to transceivers mounted on passing trains. In some examples, the train mounted transceivers may initiate communications with the wayside anchor(s) to perform a ranging process. Additionally or alternatively, the anchors work in conjunction with the transceivers mounted on passing trains to perform range UWB measurements. The resulting range data allows the train to accurately determine the train's position along the track in the subway, relative to the wayside anchors.

To support the requirements of a train positioning system, the UWB wayside anchors may be networked together to allow data communications between the anchors and a central office. This networking may be accomplished either wirelessly (e.g., using a different data radio/wireless interface to avoid interference with UWB transponders, or alternatively using UWB radio but with a different UWB mode and/or different frequency band in order to allow operation of both UWB radios without interfering with UWB train location operations), or via a wired connection (e.g., Ethernet based connections; employing copper Ethernet wiring, fiber optic cabling, etc.). In addition to allowing communication between the central office and the wayside anchors, this network also allows configuration of the wayside anchors to be performed remotely.

In the event of an intrusion which has resulted in the suspension of train traffic along a section of track or zone of tracks, the UWB wayside network may be reconfigured (e.g., on-site or remotely, such as from a central office) to perform a monostatic radar function, using the same UWB transponder (transmitter, receiver, and antenna) normally used for train location ranging activities. This may allow use of installed infrastructure for this personnel location function without requiring any additional infrastructure along the wayside. In some implementations, the UWB detection devices or sensors may be configured or implemented as "monostatic" radars—that is, with the same antenna being used for the transmission and the reception of signals. Alternatively, in some implementations, the anchors may incorporate multiple antennas. For example, anchors with two antennas may be used such that when configured as detection radar, the anchors may operate in a "bistatic" configuration—that is, with separate antennas for transmitter and receiver. This may increase the hardware necessary in the anchors, but may allow for improved radar performance.

An impulse-based UWB ranging system may be well-suited for use as radar. The signal used for impulse-UWB transmission may be inherently advantageous for radar because it uses extremely short pulses (using a wide bandwidth), enabling rejection of clutter, and allowing discrimination between targets.

Once the anchor(s) to use for personnel detection have been identified according to the area where the intruder has been reported, the UWB radar network would be employed. The appropriate wayside anchors to use for radar detection would be chosen according to this information. These selected anchors would then be temporarily configured for radar operation at the central office, since trains are no longer operating in the selected areas.

FIG. 1 illustrates an example deployment of subway personnel detection system, in accordance with the present disclosure. Shown in FIG. 1 is an example deployment of an array of detection devices 100.

Each detection device 100 may comprise suitable hardware and related circuitry for performing intruder detection functions in accordance with the present disclosure, particularly using UWB technology (e.g., based on transmission, reception, and processing of UWB signals), as described herein. In this regard, the detection devices 100 may be configured for detecting personnel in subway systems (e.g., on or near tracks traversed by trains in the subway system).

Figure 1A:
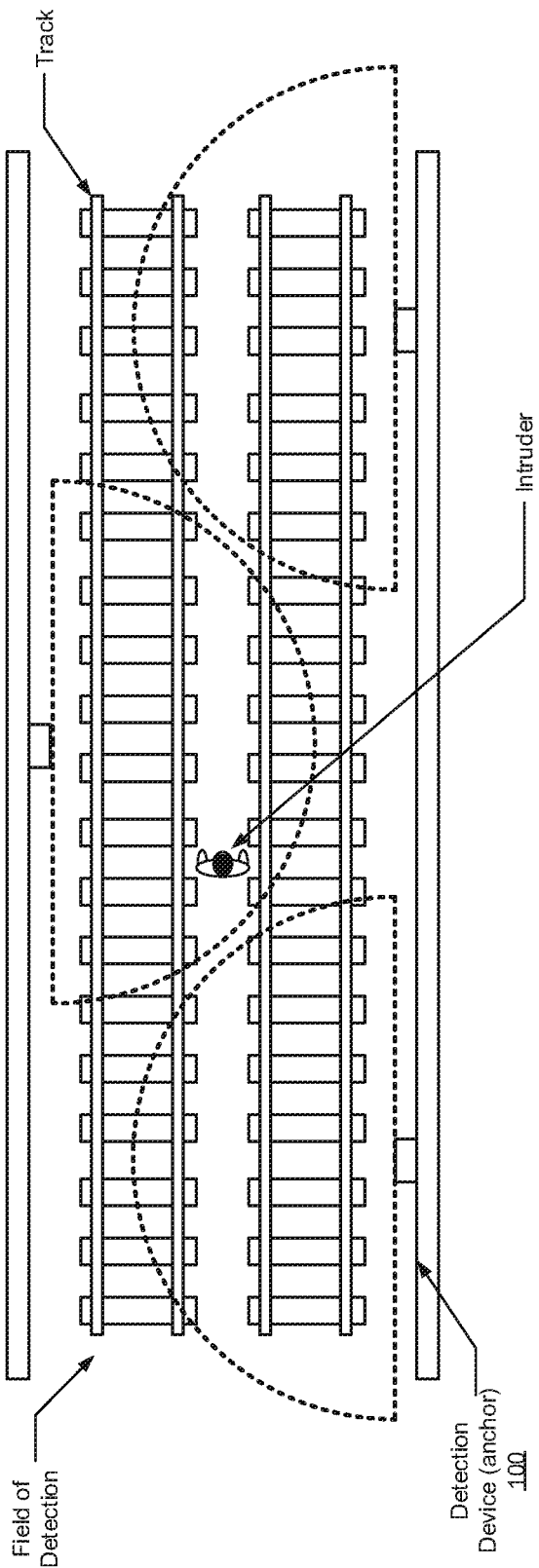
FIG. 1A illustrates another example deployment of subway personnel detection system, in accordance with the present disclosure.

For example, as illustrated in FIG. 1, the array of detection devices 100 may be deployed within a subway tunnel. In this regard, the detection devices 100 may be configured as UWB intrusion detectors, and deployed within the subway tunnel, being installed or mounted as anchors on the walls and/or ceiling of the subway tunnel. Each detection device 100 may be configured to operate as UWB based radar sensor, being limited to sensing a particular "field of detection". This field of detection may be described by a swept "detection angle" of a maximum distance radius, and may have an appearance similar to a semi-circle (e.g., approximately a 180-degree field of detection), as shown in FIG. 1. Although multiple anchors and detection devices are employed, there may be gaps between adjacent fields of detection, as shown in FIG. 1A. In some examples, the distance between anchors and/or detection angle may not result in overlapping fields of detection.

The detection devices 100 may be deployed in a manner that provides optimal coverage and detection. For example, as shown in the example deployment illustrated in FIG. 1, in order to cover a particular length of track that is prone to intrusion (e.g., section of the track within subway tunnel), the detection devices 100 may be deployed in alternating arrangement, with subsequent anchors mounted on opposite sides of the tunnel, and with each anchor being configured such that its field of detection is directed onto the track.

The array of UWB radar transducers (and any associated processing electronics, if used) may be configured to provide UWB-based sensing (e.g., in radar-like manner) over the length of track(s), to allow detection of the presence of objects (including individuals and/or physical objects) thereon. While not specifically shown in FIG. 1, in some instances, the array may be arranged or configured such that there is some overlap in the detection pattern (the fields of detection) of the UWB radar sensors, to ensure a continuous protection area along a desired area (track section in particular tunnel).

In instances where there may be multiple tracks, the array may be configured to provide detection for several tracks. For example, as shown in the particular example implementation illustrated in FIG. 1, the sensors may be configured such as their fields of detection cover the multiple (e.g., two) adjacent tracks in the tunnel. In some examples, additional anchors may be deployed in certain areas (e.g., areas of high traffic; areas with multiple tracks; areas with crossovers; areas with pedestrian crossings; etc.), to provide better personnel detection coverage. In operation, a maximum and/or minimum range of detection can be implemented, limited by the field of detection provided by the anchor and/or detection device. Once an object has been detected, information associated with the object detection (e.g., the time of detection, location of the object, information regarding other trains/personnel in the area, etc.) can be transmitted to one or more of a trains operating in the area (regardless of whether the particular train is involved in detection of the object), an operator (such as in a central control system or facility), and/or security personnel, as non-limiting examples.

The UWB radar network may be operated manually or automatically. An example of manual operation may be where the operator would access each of the anchors chosen to cover the desired search area. The operator then could view a single radar reflection image to look for a large moving object (the intruder). Alternatively, the operator could display multiple anchor radar reflection images on a screen, waiting for telltale movement of an intruder, or the presence of an object in a location where an object may not be normally expected to appear.

In order to expedite the search and reduce the number of personnel required to locate intruders, an option may be to automate the process by configuring computer to scan the set of chosen anchors, analyzing the received radar data for movement of a minimum sized cross-sectional area. When movement which meets the chosen criteria may be detected by the computer, the operator may be notified and the image sequence showing the movement may be displayed.

In either approach, manual or automatic, when the operator spots suspicious movement or an unusual presence, he or she may notify the proper authorities, such as the police. The operator will send the authorities the track location of the anchor where detection was made (such as the track marker number, which may be similar to mile markers along interstate highways), as well as the track ID. This information will allow the authorities to know the location to begin the on-site search.

In some instances, the detection devices may be configured for obtaining additional information about intruders (beyond merely detecting presence of the intruders). For example, the detection devices may be configured for tracking the movement of detected intruders. In this regard, the detection anchors may (e.g., manually or automatically, such as via software programming) track the direction of movement of the intruder (e.g., position vs time). Obtaining such additional information about intruders may provide better data for authorities attempting to apprehend the individuals.

In instances where directional antenna may be used for the anchors, instead of an omnidirectional antenna, the field of view for the UWB radar may be diminished. The range of the radar sensing, however, will likely be improved by the increased gain of the antenna in certain directions. Usually the directivity of such an antenna may be along the track, since high gain to the sides of the track may not be generally useful for train ranging measurements or detection of personnel on the tracks. Even if there is a region of reduced field of view by the directional antenna, this zone may be likely very small, and likely may not diminish the utility of the UWB radar since trespassers normally may be moving and should still be easily detected.

Figure 2:
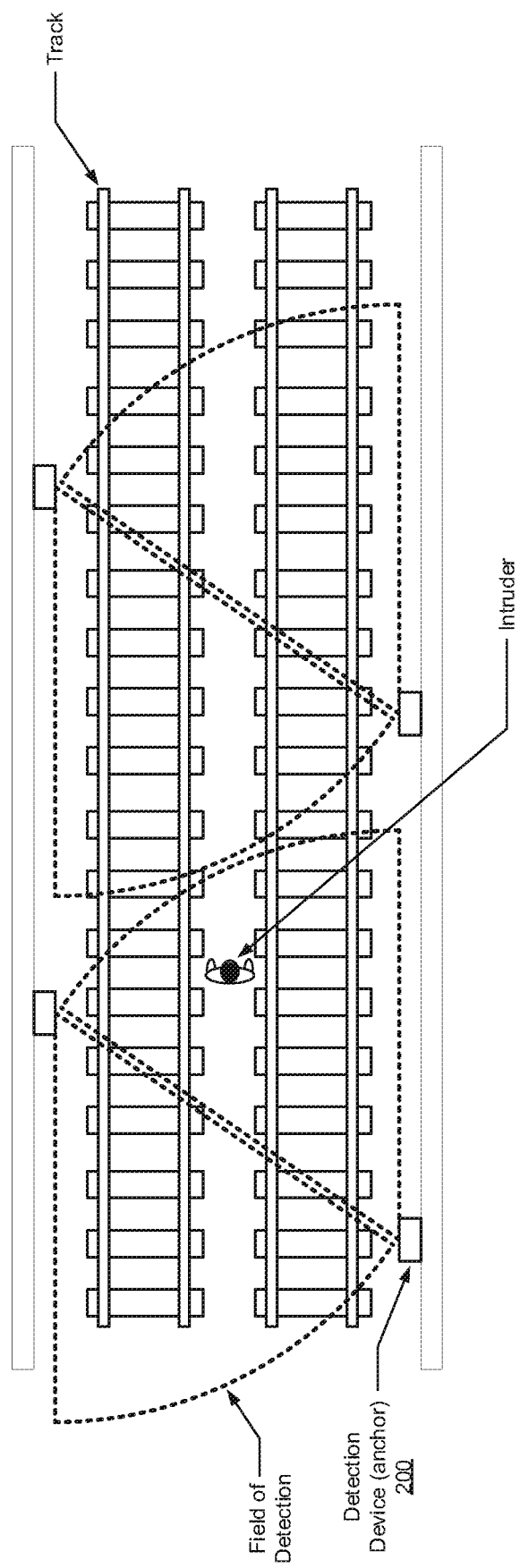
FIG. 2 illustrates another example deployment of subway personnel detection system, in accordance with the present disclosure.

FIG. 2 illustrates another example deployment of subway personnel detection system, in accordance with the present disclosure. Shown in FIG. 2 is an example deployment of an array of detection devices 200.

Each detection device 200 may be similar to the detection device 100 of FIG. 1, and may operate in a similar manner, individually and/or within the array as a whole, to provide intruder detection in subway use settings. FIG. 2 illustrates an alternative example deployment of UWB intrusion detectors configured with different fields of detection compared to the array described with respect to FIG. 1, however.

For example, as shown in FIG. 2, the array of detection devices 200 may be configured such that the devices' fields of detection are along the length of the tunnel. So may be desirable for providing longer range detection, which may also allow for use of fewer anchors to cover the same length of the tunnel. Such an arrangement may be limited, however, by the topography of the tunnels where the anchors are deployed. For example, the arrangement/configuration shown in FIG. 2 may be more suited for sections of the tunnel that are straight rather than curves.

Some UWB implementations will allow combined ranging and radar. Other implementations will be mutually exclusive, where ranging must be halted to allow radar detection to be used. For detection of intruders, a mutually exclusive system is not a limitation since the track section where the UWB anchors will be temporarily repurposed is not supporting train operation at the time of the search.

While the various implementations are described in conjunction with subway system, the application of personnel detection in accordance with the present disclosure need not be solely limited to subway systems. For example, similar techniques may also be utilized on surface tracks in locations where track access is limited by track elevation, fences, walls, buildings, etc. The utility of this detection system is diminished in areas where people or vehicles may be normally crossing the tracks or near the tracks, such as at railroad crossings and passenger stations. In areas where people may be normally located, the radar system will likely have a "false positive" detections, finding people that may be doing normally allowed activities and are not trespassing.

Further, the application of the personnel detection system need not be solely limited to intruder detection. For example, systems implemented in accordance with the present disclosure may also be configured used for periodic detection of track workers on the track, or verification that track workers may be at the expected location on the track. This application is useful to improve safety for track workers.

In some instances, the UWB detection devices (anchors) may be configured for detecting presence of other items besides intruders (or individuals in general). For example, the UWB detection devices (anchors) may be configured for detecting the presence of vehicles (or trains in general) on the tracks. This may be desirable as it may allow for detecting unreachable, stalled, and/or otherwise disabled trains (e.g., trains that lost power, or trains whose radios may have failed, etc., and may not be able to communicate autonomously, such as with the central office). Using the UWB detection devices (anchors) to detect and report such trains may be desirable it may allow the central command office to determine an exact location of such unreachable trains. The UWB detection devices (anchors) may also detect the location of maintenance machines on the tracks as well.

An advantage of this personnel detection system is that it performs silent surveillance. The individual(s) discovered will not have any indication that he or she has been detected and will not be motivated to flee rapidly.

Figure 3:
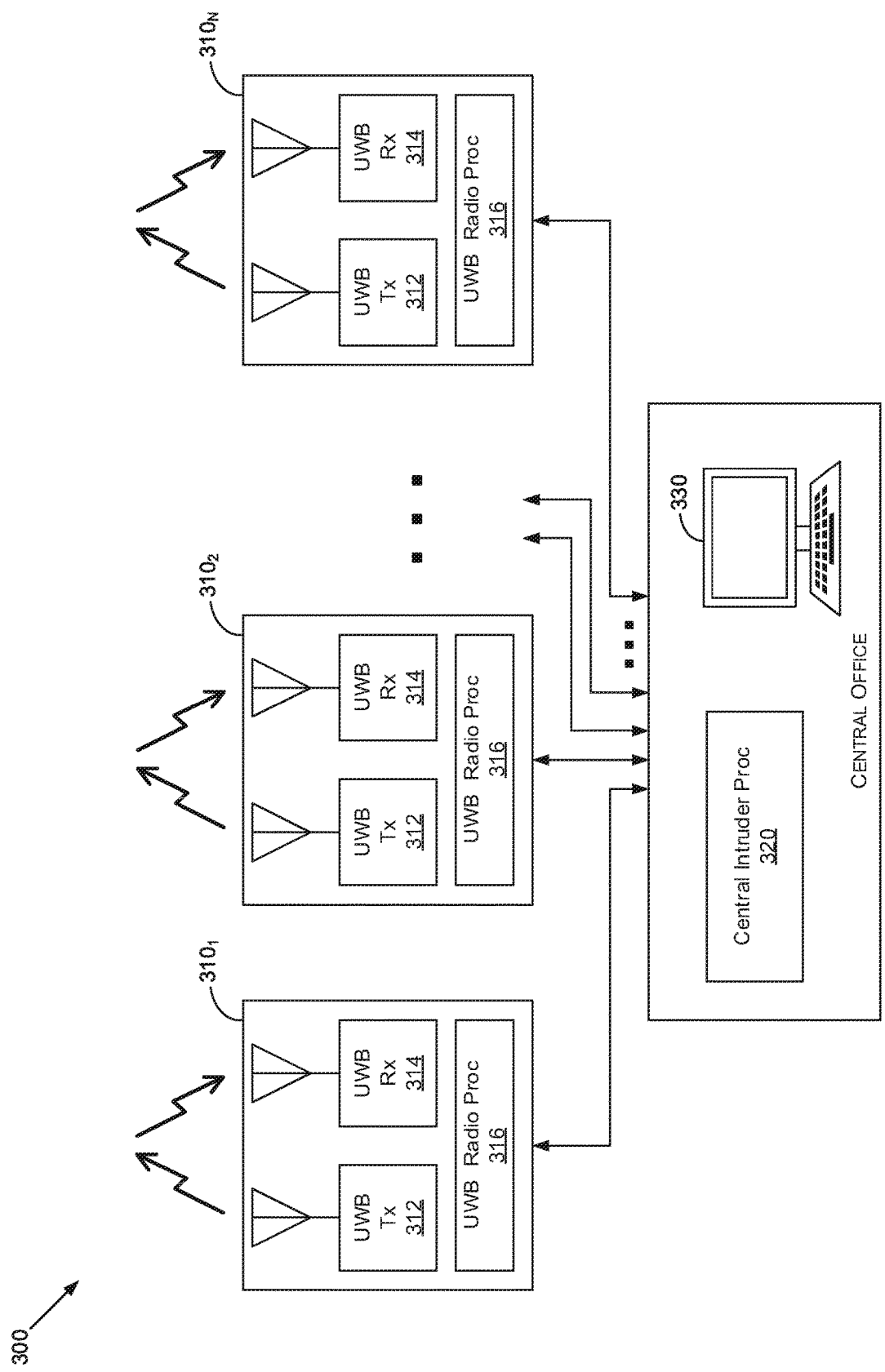
FIG. 3 illustrates an example subway personnel detection system, in accordance with the present disclosure.

FIG. 3 illustrates an example subway personnel detection system, in accordance with the present disclosure. Shown in FIG. 3 is a subway personnel detection system 300, which may be used for providing subway personnel detection, employing multiple UWB detectors deployed in subway tunnels, with associated processing resources (within the detectors and/or external to them, including remote resources) to detect when an intruder is present in subway tunnels (e.g., based on pre-defined and/or programmed detection criteria). In some examples, the UWB detectors may be mounted on one or more trains, operable to transmit and receive signals and/or process signals (e.g., feedback and/or received signals from another detector) to detect when an intruder or object is present in subway tunnels, in accordance with disclosed systems and methods.

The subway personnel detection system 300 may comprise a plurality of subway personnel detection devices 3101-310N and central office that may comprise an intrusion processor 320 and a service terminal 330.

Each of the subway personnel detection devices 3101-310N may be similar to, and may represent an implementation of detection devices 100 of FIG. 1 and/or the detection devices 200 of FIG. 2. For example, as shown in FIG. 3, each detection devices 310 may comprise an UWB transmitter 312, an UWB receiver 314, and an UWB processor 316. In operation, each subway personnel detection device 310 may transmit UWB signals, via the UWB transmitter 312 (and a corresponding antenna), may receive UWB signals, via UWB receiver 314 (and a corresponding antenna), and may process transmitted and/or received UWB signals, via the UWB processor 316. The disclosure is not limited to use of separate and dedicated transmitter and receiver, however. For example, in some implementations, a single UWB transceiver may be utilized (instead of separate UWB transmitter and UWB receiver), comprising suitable circuitry for handling both transmission and reception of UWB signals. In some examples, a single antenna may be employed, whereas in other examples multiple antennas are employed (in the single UWB transceiver and/or the UWB transmitter or the UWB receiver).

The intrusion processor 320 may comprise suitable circuitry that may be configured for centrally managing and controlling subway personnel detection operations when the system is deployed. In this regard, intrusion processor 320 may communicate with the detection devices 3101-310N, such as via wired and/or wireless connections, to receive therefrom information related to any detected individuals (or objects) in the tunnels, and/or to (optionally) provide information to the detection devices 3101-310N (e.g., feedback, control, etc.). For example, the intrusion processor 320 may be configured to process data provided by the subway personnel detection devices 3101-310N (e.g., based on UWB transmission/reception performed thereby), may provide data to the subway personnel detection devices 3101-310N (e.g., control data), etc. In some implementations, the intrusion processor 320 may also provide power to the subway personnel detection devices 3101-310N, such as when these devices lack dedicated power supply. Alternatively, the detection devices 3101-310N may be powered by other means independent of the intrusion processor 320 (e.g., using embedded power storage and/or generation components, using a connection to local power sources, etc.).

The service terminal 330 may be configured for allowing operators in the central office to interact with, and if needed control operations of the system (e.g., the intrusion processor 320, and if needed, the subway personnel detection devices 3101-31 ON, via the intrusion processor 320). The service terminal 330 may also be configured for providing feedback to the operators, such as alerts relating to detected intruders or other objects in the subway tunnels.

An example system for subway intrusion detection, in accordance with the present disclosure, comprises one or more detection devices configured for deployment within a subway tunnel, and one or more circuits. Each detection device comprises an ultra-wideband (UWB) based transmitter, configured for transmitting UWB signals, and an ultra-wideband (UWB) based receiver, configured for receiving UWB signals, with the one or more detection devices being configured for transmitting UWB signals into an area within the subway tunnel, the area comprising one or more tracks traversed by a train in the subway tunnel. The one or more circuits are configured to process received UWB signals, the processing comprising determining received UWB signals corresponding to echoes of transmitted UWB signals transmitted by the one or more detection devices, and detecting based on the echoes of the transmitted UWB signals when an object is present within detection range of at least one of the one or more detection devices.

In an example embodiment, the one or more circuits are configured to assess the object, the assessing comprising determining when the object represents an intrusion within the subway tunnel.

In an example implementation, the one or more circuits are configured to determine that the object represents an intrusion based on a determination that the object is on or in proximity to at least one of the one or more tracks.

In an example implementation, the one or more circuits are configured to identify a type corresponding to each object.

In an example implementation, the one or more circuits are configured to identify whether the object comprises a person or a physical foreign object.

In an example implementation, the one or more circuits are configured to generate an alert based on the determination that the object represents an intrusion within the area.

In an example implementation, the one or more circuits are configured to wirelessly communicate information relating to detected object to one or more of a train approaching a section of the subway tunnel where the object is present, a wayside device disposes on or near one of the one or more tracks, and a central control system that manages personnel detection operations.

In an example implementation, the one or more circuits are configured to detect objects within a specified minimum and/or maximum range.

In an example implementation, the one or more circuits are configured to detect, based on received UWB signals, movement associated with the object.

In an example implementation, the one or more circuits are configured for deployment on walls and/or a ceiling of the subway tunnel.

An example method for subway intrusion detection, in accordance with the present disclosure, comprises transmitting UWB signals into an area within a subway tunnel, the area comprising one or more tracks traversed by a train in the subway tunnel; receiving UWB signals within the area; and processing received UWB signals. The processing comprises determining received UWB signals corresponding to echoes of the transmitted UWB signals, and detecting based on the echoes of the transmitted UWB signals when an object is present within the area.

In an example implementation, the method further comprises assessing the object, with the assessing comprising determining when the object represents an intrusion within the subway tunnel.

In an example implementation, the method further comprises determining that the object represents an intrusion based on a determination that the object is on or in proximity to at least one of the one or more tracks.

In an example implementation, the method further comprises identifying a type corresponding to each object.

In an example implementation, the method further comprises identifying whether the object comprises a person or a physical foreign object.

In an example implementation, the method further comprises generating an alert based on the determination that the object represents an intrusion within the area.

In an example implementation, the method further comprises wirelessly communicating information relating to the detected object to one or more of a train approaching a section of the subway tunnel where the object is present, a wayside device disposes on or near one of the one or more tracks, and a central control system that manages personnel detection operations.

In an example implementation, the method further comprises detecting objects within a specified minimum and/or maximum range.

In an example implementation, the method further comprises detecting, based on received UWB signals, movement associated with the object.

Another example system for subway intrusion detection, in accordance with the present disclosure, comprises one or more detection devices configured for deployment within a subway tunnel, and one or more circuits. Each detection device comprises an ultra-wideband (UWB) based transceiver, configured for transmitting and receiving UWB signals, with the one or more detection devices being configured for transmitting UWB signals into an area within the subway tunnel, the area comprising one or more tracks traversed by a train in the subway tunnel. The one or more circuits are configured to process received UWB signals, the processing comprising determining received UWB signals corresponding to echoes of transmitted UWB signals transmitted by the one or more detection devices, and detecting based on the echoes of the transmitted UWB signals when an object is present within detection range of at least one of the one or more detection devices.

In some example implementations, a method for range detection in a subway system is provided that may work in conjunction with the describe object detection system. In particular examples, the method determines a range (and/or position) of a train within the subway system (e.g., relative to one or more wayside anchors). The method includes transmitting UWB signals into an area within a subway tunnel, the area comprising one or more tracks traversed by a train in the subway tunnel. UWB signals may be transmitted and/or received at a wayside anchor and/or a train mounted transceiver within the area. The received UWB signals can be processed (e.g., at a processor associated with the wayside anchor, the train mounted transceiver, and/or a central processing system) to determine one or more characteristics of received UWB signals corresponding to the transmitted UWB signals. In examples, range data can be determined based on the one or more characteristics of the received UWB signals. A position of the train can then be determined based on the range data. In examples, the one or more characteristics include a phase of the signal, a time of flight of the signal, a power of the signal, or a frequency of the signal. In examples, the one or more characteristics include embedded data, such as modulated or encoded data in the signal transmission, the data including information to determine range and/or position (e.g., timing information, location of the transmitter and/or receiver, relative movement of the transmitter and/or receiver, etc.). In examples, signals are transmitted from one or more of the train mounted UWB transceiver and/or the wayside anchor. One or more of these signals can be processed to determine one or more of range data and/or position data of the train (e.g., relative to the wayside anchor).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, causing the machine and/or computer to perform the processes as described herein.

Various embodiments in accordance with the present invention may be realized in hardware, software, or a combination of hardware and software. The present invention may be realized in a centralized fashion in at least one computing system, or in a distributed fashion where different elements are spread across several interconnected computing systems. Any computing system or other apparatus adapted for carrying out the methods described is suited. A typical combination of hardware and software may be a general-purpose computing system with a program or other code that, when being loaded and executed, controls the computing system so it carries out the methods described. Another typical implementation may comprise an application specific integrated circuit or chip.

Various embodiments in accordance with the present invention may also be embedded in a computer program product, which comprises all the features enabling the implementation of the methods described, and which when loaded in a computer system can carry out these methods. Computer program in the present context means any expression, in any language, code or notation, of a set of instructions intended to cause a system having an information processing capability to perform a particular function either directly or after either or both of: a) conversion to another language, code or notation; b) reproduction in a different material form.

While the present invention has been described referring to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for subway intrusion detection, the system comprising:
   a plurality of detection devices,
      wherein each detection device comprises:
         an ultra-wideband (UWB) based transmitter, configured for transmitting UWB signals; and
         an ultra-wideband (UWB) based receiver, configured for receiving UWB signals; and
      wherein each detection device is configured for:
         deployment within a subway tunnel; and
         transmitting UWB signals into an area within the subway tunnel, the area comprising one or more tracks traversed by a train in the subway tunnel; and
   one or more circuits configured to:
      process received UWB signals, the processing comprising determining received UWB signals corresponding to echoes of transmitted UWB signals transmitted by the plurality of detection devices; and
      detect based on the echoes of the transmitted UWB signals when an object is present within the area, wherein at least a portion of the detecting is done automatically, the automatic detecting comprising:
         automatically selecting one or more detection devices of the plurality of detection devices, and
         automatically analyzing the echoes of the transmitted UWB signals obtained by the one or more detection devices based on a detection criteria that comprise, at least, movement of a minimum sized cross-sectional area;
   wherein:
      the plurality of detection devices are deployed near at least one section of the one or more tracks, and
      deployment of the plurality of detection devices is set or adjusted to ensure full detection coverage in the at least one section of the one or more tracks.

2. The system of claim 1, wherein the one or more circuits are configured to assess the object, wherein the assessing comprises determining when the object represents an intrusion within the subway tunnel.

3. The system of claim 2, wherein the one or more circuits are configured to determine that the object represents an intrusion based on a determination that the object is on or in proximity to at least one of the one or more tracks.

4. The system of claim 1, wherein the one or more circuits are configured to identify a type corresponding to each object.

5. The system of claim 4, wherein the one or more circuits are configured to identify whether the object comprises a person or a physical foreign object.

6. The system of claim 1, wherein the one or more circuits are configured to generate an alert based on the determination that the object represents an intrusion within the area.

7. The system of claim 1, wherein the one or more circuits are configured to wirelessly communicate information relating to detected object to one or more of: a train approaching a section of the subway tunnel where the object is present, a wayside device disposes on or near one of the one or more tracks, and a central control system that manages personnel detection operations.

8. The system of claim 1, wherein the one or more circuits are configured for detecting objects within a specified minimum and/or maximum range.

9. The system of claim 1, wherein the one or more circuits are configured to detect, based on received UWB signals, movement associated with the object.

10. The system of claim 1, wherein at least one of the plurality of detection devices is configured for deployment on walls and/or a ceiling of the subway tunnel.

11. A method for subway intrusion detection, the method comprising:
   transmitting, by a plurality of detection devices, UWB signals into an area within a subway tunnel, the area comprising one or more tracks traversed by a train in the subway tunnel;
   receiving, by the plurality of detection devices, received UWB signals within the area;
   processing the received UWB signals, the processing comprising determining received UWB signals corresponding to echoes of the transmitted UWB signals; and
   detecting based on the echoes of the transmitted UWB signals when an object is present within the area, wherein at least a portion of the detecting is done automatically, the automatic detecting comprising:
automatically selecting one or more detection devices of the plurality of detection devices, and
automatically analyzing the echoes of the transmitted UWB signals obtained by the one or more detection devices based on a detection criteria that comprise, at least, movement of a minimum sized cross-sectional area;
wherein:
the plurality of detection devices are deployed near at least one section of the one or more tracks, and
deployment of the plurality of detection devices comprises setting or adjusting the deployment to ensure full detection coverage in the at least one section of the one or more tracks.

12. The method of claim 11, further comprising assessing the object, wherein the assessing comprises determining when the object represents an intrusion within the subway tunnel.

13. The method of claim 12, further comprising determining that the object represents an intrusion based on a determination that the object is on or in proximity to at least one of the one or more tracks.

14. The method of claim 11, further comprising identifying a type corresponding to each object.

15. The method of claim 14, further comprising identifying whether the object comprises a person or a physical foreign object.

16. The method of claim 11, further comprising generating an alert based on the determination that the object represents an intrusion within the area.

17. The method of claim 11, further comprising wirelessly communicating information relating to the detected object to one or more of: a train approaching a section of the subway tunnel where the object is present, a wayside device disposes on or near one of the one or more tracks, and a central control system that manages personnel detection operations.

18. The method of claim 11, further comprising detecting objects within a specified minimum and/or maximum range.

19. The method of claim 11, further comprising detecting, based on received UWB signals, movement associated with the object.

20. A system for subway intrusion detection, the system comprising:
a plurality of detection devices,
wherein each detection device comprises an ultra-wideband (UWB) based transceiver, configured for transmitting and receiving UWB signals; and
wherein each detection device is configured for:
deployment within a subway tunnel; and
transmitting UWB signals into an area within the subway tunnel, the area comprising one or more tracks traversed by a train in the subway tunnel; and
one or more circuits configured to:
process received UWB signals, the processing comprising determining received UWB signals corresponding to echoes of transmitted UWB signals transmitted by the detection device; and
detect based on the echoes of the transmitted UWB signals when an object is present within the area, wherein at least a portion of the detecting is done automatically, the automatic detecting comprising:
automatically selecting one or more detection devices of the plurality of detection devices, and
automatically analyzing the echoes of the transmitted UWB signals obtained by the one or more detection devices based on a detection criteria that comprise, at least, movement of a minimum sized cross-sectional area;
wherein:
the plurality of detection devices are deployed near at least one section of the one or more tracks, and
deployment of the plurality of detection devices is set or adjusted to ensure full detection coverage in the at least one section of the one or more tracks.

21. The system of claim 1, wherein setting or adjusting the deployment comprises use of one or more of optimal arrangement of the plurality of detection devices, selection of antenna used in the plurality of detection devices, and configuring of the antenna used in the plurality of detection devices.

22. The method of claim 11, wherein the setting or adjusting comprises utilizing one or more of optimal arrangement of the plurality of detection devices, selection of antenna used in the plurality of detection devices, and configuring of the antenna used in the plurality of detection devices.

23. The system of claim 20, wherein setting or adjusting the deployment comprises use of one or more of optimal arrangement of the plurality of detection devices, selection of antenna used in the plurality of detection devices, and configuring of the antenna used in the plurality of detection devices.

* * * * *